United States Patent [19]

Obrecht

[11] Patent Number: 4,565,541
[45] Date of Patent: Jan. 21, 1986

[54] SMALL DEFLECTION COUPLING FOR OSCILLATING SHAFTS

[75] Inventor: Georges Obrecht, Pont de Claix, France

[73] Assignee: Alsthom-Atlantique, Paris, France

[21] Appl. No.: 601,394

[22] Filed: Apr. 17, 1984

[30] Foreign Application Priority Data

Apr. 18, 1983 [FR] France ................. 83 06274

[51] Int. Cl.⁴ .............................................. F16D 3/38
[52] U.S. Cl. .................... 464/155; 464/106
[58] Field of Search ............ 403/57, 74, 121; 464/106, 147, 150, 151, 155, 170, 171

[56] References Cited

U.S. PATENT DOCUMENTS

| 1,528,432 | 3/1925 | Kay | 464/155 |
| 1,581,802 | 4/1926 | Holmes et al. | 464/106 |
| 1,830,394 | 11/1931 | Glass | 464/106 |
| 2,712,739 | 7/1955 | Dempster | 464/155 |
| 2,841,968 | 7/1958 | Helmke | 464/106 |
| 3,128,611 | 4/1964 | Doran | 464/147 |

FOREIGN PATENT DOCUMENTS

| 378266 | 9/1907 | France . |
| 763623 | 5/1934 | France . |
| 781593 | 5/1935 | France . |
| 868026 | 12/1941 | France . |
| 2384154 | 10/1978 | France . |
| 2423352 | 11/1979 | France . |
| 3519 | of 1910 | United Kingdom . |
| 235081 | 6/1925 | United Kingdom | 464/106 |
| 238686 | 8/1925 | United Kingdom . |
| 2110792A | 6/1983 | United Kingdom . |

*Primary Examiner*—Stuart S. Levy
*Assistant Examiner*—Daniel P. Stodola
*Attorney, Agent, or Firm*—Sughrue, Mion, Zinn, Macpeak & Seas

[57] ABSTRACT

A solid core (3) serves to transmit both torque and axial thrust (if any) between first and second end pieces (1 and 2) having longitudinal axes that may be up to 10° out of alignment. The core is close to being cubical in shape, having two interfitting sets of three adjacent sides each comprising a first semicircular plane face, a semi-cylindrical face, and a second semicircular plane face. Concave recesses (10, 13) are provided in respective front faces of the two end pieces to receive each of the semi-cylindrical surfaces of the core. The "chunky" nature of the core maximizes the torque that can be transmitted in a given volume.

7 Claims, 6 Drawing Figures

SMALL DEFLECTION COUPLING FOR OSCILLATING SHAFTS

The present invention relates to a small deflection coupling for oscillating shafts.

BACKGROUND OF THE INVENTION

One known type of coupling comprises:

first and second end pieces suitable for fixing to the facing ends of first and second shafts, said end pieces having respective longitudinal axes which substantially intersect at a coupling center, and having respective first and second concave cylindrical bearing surfaces which are of circular symmetry about respective first and second oscillation axes which also substantially intersect at the coupling center and which are perpendicular to respective ones of the said longitudinal axes of the first and second end pieces, said cylindrical bearing surfaces being of the same diameter;

an intermediate piece having first and second convex cylindrical bearing surfaces which are of circular symmetry about two substantially intersecting perpendicular oscillation axes, said intermediate part being disposed between the said end pieces which are oriented relative to one another in such a manner that the first and second convex bearing surfaces of the intermediate piece co-operate with the first and second concave bearing surfaces of the first and second end pieces respectively, thereby simultaneously enabling driving torque to be transmitted between said shafts when rotating about their axes, enabling axial thrust to be transmitted between said shafts, and, by rocking about said first and second oscillation axes, enabling said shafts to oscillate relative to each other;

each of said end pieces being in the form of a solid having a front face facing the other end piece, which front face is in the form of a convex dihedral with the line of intersection of the dihedral half-planes constituting the oscillation axis of the end piece, the dihedral angle being equal to 180° less twice the maximum angle of deflection between the axes of the two end pieces, said concave cylindrical bearing surface being hollowed out in the front face of the end piece such that the cross section of the bearing surface is an arc of a circle extending over said dihedral angle, and such that, when said intermediate piece is received in said hollow and any force is applied thereto in a direction which is perpendicular both to the longitudinal axis of the end piece and to the oscillation axis of the end piece, and in particular when any torque is transmitted thereby, a longitudinal reaction is created tending to urge the end piece away from the intermediate piece, the length of the cylindrical concave bearing surface parallel to the generator lines of the cylinder being equal to the length of the convex bearing surface of the intermediate piece so as to prevent the intermediate piece from moving in the hollow of the concave bearing surface in a direction parallel to the oscillation axis of the end piece; and a retaining member for holding said end pieces together against said longitudinal reaction.

Such a device is described in British Patent publication No. 2,110,792 A (Tous).

In this known device, the intermediate piece is in the form of two semi-cylindrical portions each having two plane semi-circular faces of diameter greater than the axial length of said semi-cylindrical portions, a cylindrical face extending over an arc of 180° and a rectangular plane face at right angles to said end faces. The axis of each semi-cylindrical portion lies in the rectangular plane face thereof. Said portions are crossed and interconnected by their plane faces being placed against each other. Since the axial length of these portions is less than their diameter, each rectangular face has a central square which is in contact with the other rectangular face and also has two end portions extending beyond two sides of the square, in other words, there is a concave right angle dihedral on either side of each portion. As a result, torque is transmitted through a portion of the intermediate piece (i.e. the square) which has an area and a second moment of area which are both small relative to the area and second moment of area of the adjacent parts. Thus, particularly when space is limited, this arrangement is unsatisfactory both for transmitting thrust and for transmitting torque.

It appears that this known device is poor at transmitting large values of axial thrust and torque, stands up badly to shock in the axial direction, and is expensive both to manufacture and to maintain because of difficulties in assembly and disassembly.

Preferred embodiments of the present invention avoid these drawbacks provided the relative oscillation between the shafts is limited to a relatively small angle, e.g. not more than 10° on either side of a nominal in-line position. In particular, the invention can provide the following advantages:

high axial thrust, high values of transmitted torque, compact, stands up very well to axial shocks, simple to assemble, disassemble, maintain and adapt to various environmental conditions of temperature and chemicals;

simple to manufacture.

SUMMARY OF THE INVENTION

The present invention provides a coupling of the above-defined type, and including the following improvement:

The intermediate piece is constituted by a solid core having a surface which is convex over major areas, said surface including two portions which constitute said convex bearing surfaces which are semi-cylindrical having a right cross section in the form of a semicircle and which have an axial length equal to the diameter of the semicircle, the center of the semicircle being substantially at the mid point of the said axial length whereby the surface of the core is at least mostly constituted by said semi-cylindrical bearing surfaces, each of which is terminated by two plane semi-circular bearing surfaces extending from the ends of the semicircles of the cylinder, said plane semicircular bearing surfaces constituting end faces of a semi-cylindrical volume whose side surface is constituted by the other semi-cylindrical bearing surface, whereby said core is capable of transmitting high driving torque and high axial thrust simultaneously, while being easy to machine.

Each concave cylindrical bearing surface is in the form of an add-on shell having a semi-cylindrical inside surface which is machined to co-operate with a semi-cylindrical bearing surface of the solid core and having plane second and third inside surfaces which are semi-circular for co-operating with the plane bearing surfaces of the core, the outside surfaces of the shell bearing against the walls of a recess hollowed out of the end piece to prevent the shell from moving or from distorting, thereby enabling worn parts to be readily replaced. More particularly, each of said shells is constituted by two half-shells which are placed side-by-side in a prismatic recess of square section hollowed out of the end piece, each halfshell having a semi-cylindrical bearing surface and one semicircular bearing surface.

The retaining member is constituted by a rigid sheath which is fixed to the first end piece and which extends beyond the first end piece to encompass the second end piece, said sheath being provided with a spherical concave bearing surface which co-operates with a spherical convex bearing surface on the second end piece, both of said spherical bearing surfaces being centered on the coupling center and each being limited to an annular region surrounding the second shaft.

The concave spherical bearing surface may be formed on a ring which is screwed into the end of the sheath and which projects radially inwardly therefrom so as to enable the second end piece to be inserted in the sheath before the ring is screwed into place, and also enabling axial play due to wear to be taken up.

The concave and the convex spherical bearing surfaces may alternatively be formed on two independent rings (one for the convex surface the other for the concave surface), which rings are both held in place by a third ring which is screwed into the sheath.

BRIEF DESCRIPTION OF THE DRAWINGS

Embodiments of the invention are described with reference to the accompanying drawings in which items that appear in several different figures are given the same reference numerals in all of them. Further, it should be understood that the embodiments shown are shown by way of example, so many of the details could be replaced by technical equivalents without going beyond the scope of the invention as claimed. In the drawings:

MORE DETAILED DESCRIPTION

Figure 1:
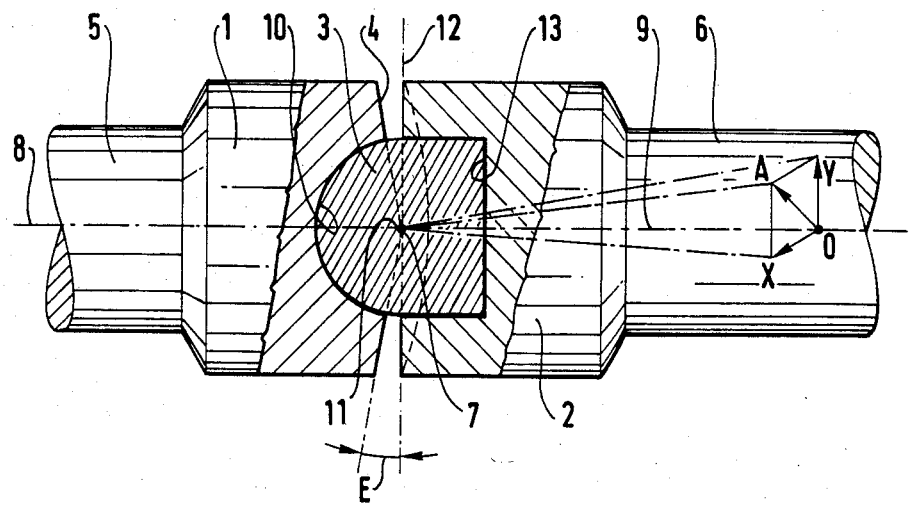
FIG. 1 is a side view in partial axial section of a coupling in accordance with the invention, the section plane passes through the aligned longitudinal axes of the coupled shafts, and also through the oscillation axis of one of the end pieces, the retaining member has been removed.

An essential idea behind the invention is to use a single member which is solid, compact, and very squat in shape to perform all the mechanical functions of transmitting thrust, of transmitting torque, and of oscillating.

The coupling is essentially constituted by three functional parts and two retaining parts.

The three functional parts are:
(a) two identical end pieces 1 and 2; and
(b) a special core 3.

The two retaining parts are:
(a) a sheath 20; and
(b) a retaining ring 21.

Each end piece 1 and 2 is cylindrical and coaxial with the shaft on which it is mounted. Its front face, i.e. the face which faces the other end piece in the coupling, is machined to take up a rather flat, convex dihedral having half planes which meet at an angle of 180°−2E, where E is the maximum angle that may exist between either shaft 5 or 6 and the axis of the core 3, or between the shafts 5 and 6 themselves. Instead of machining a dihedral, a cone having the same angle of 180°−2E could machined on the end piece. If cones are machined, their apexes meet at a point 7 and if dihedrals are machined their lines of intersection cross at a point 7 which constitutes the coupling center. The longitudinal axes 8 and 9 of the shafts 5 and 6 also intersect at the point 7.

Figure 2:
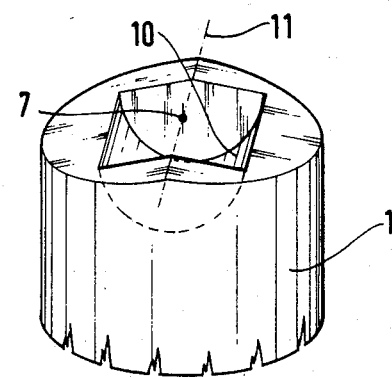
FIG. 2 is a perspective view of one of the end pieces shown in FIG. 1.

A nearly semi-cylindrical recess 10, 13 is hollowed out of the front face of each end piece 1, 2, with the diameter of the recess being equal to its length (FIG. 2).

When assembled, and with the longitudinal axes 8 and 9 in alignment, the axis 11 of the recess 10 in the end piece 1 is perpendicular to the axis 12 of the recess 13 in the end piece 2. The axes 11 and 12 intersect at the point 7 and constitute the oscillation axes of the coupling.

Figure 3:
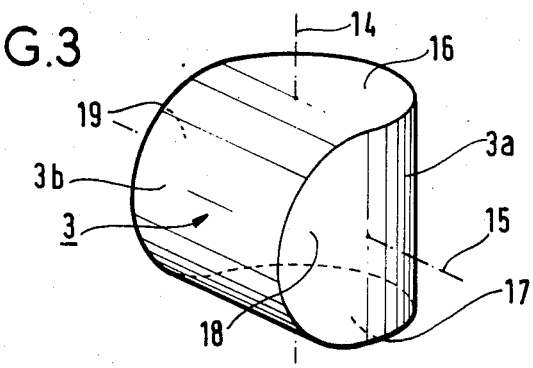
FIG. 3 is a perspective view of the solid core shown in FIG. 1.

The shape of the core can be seen more clearly in FIG. 3. It can be seen that the plane semicircular end faces 16 and 17 of a first convex semi-cylindrical bearing surface 3a about axis 14 constitute extensions of a second convex semi-cylindrical bearing surface 3b, about axis 15, and vice versa, i.e. the second semi-cylindrical bearing surface 3b has semicircular end faces 18 and 19 which constitute extensions of the first semi-cylindrical bearing surface 3a.

Figure 5:
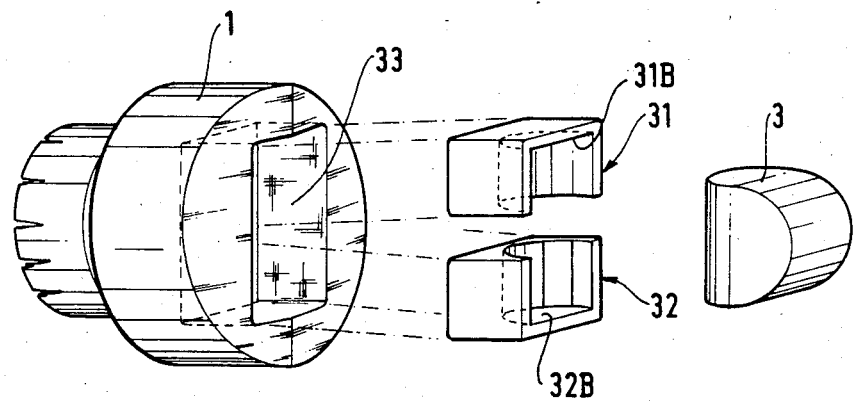
FIG. 5 is an exploded perspective view of one of the end pieces of FIG. 1 together with the FIG. 3 core.

As shown in FIG. 5, each of the semi-cylindrical recesses 10, 13 is preferably constituted by two half-length semicylindrical portions 31B, 32B hollowed out from respective add-on half shells 31 and 32. The half shells are placed end to end in prismatic hollow 33 of square cross section machined in the end piece.

The application of suitable treatments to the working surfaces for avoiding wear and seizing is facilitated by such separate construction.

When the parts 1, 2 and 3 are assembled together, any oscillation OA of the axis 9 relative to the axis 8 can be decomposed into two components about a fixed point 7:
(a) a component OX about the axis 12; and
(b) a component XA about the axis 11.

For the component XA about the axis 11, the core 3 is held fixed relative to the second end piece 2 by the core end faces 16 and 17, while being left free to rotate in the recess 10 of the first end piece 1.

Similarly, for the component OX about the axis 12, the core 3 is held fixed relative to the first end piece 1 by the core end faces 18 and 19, while being left free to rotate in the recess 13 of the second end piece 2.

Torque is transmitted both by engagement of the plane bearing faces of the core engaged the recesses in the end pieces and also by the cylindrical bearing surfaces.

The high strength of the coupling is linked to the fact that none of the parts is subjected to bending forces. The main forces are shear forces applied to the square delimited by the diameters of the four semicircular plane faces of the core. There is also a small amount of hammering between the torque transmitting surfaces.

Figure 4:
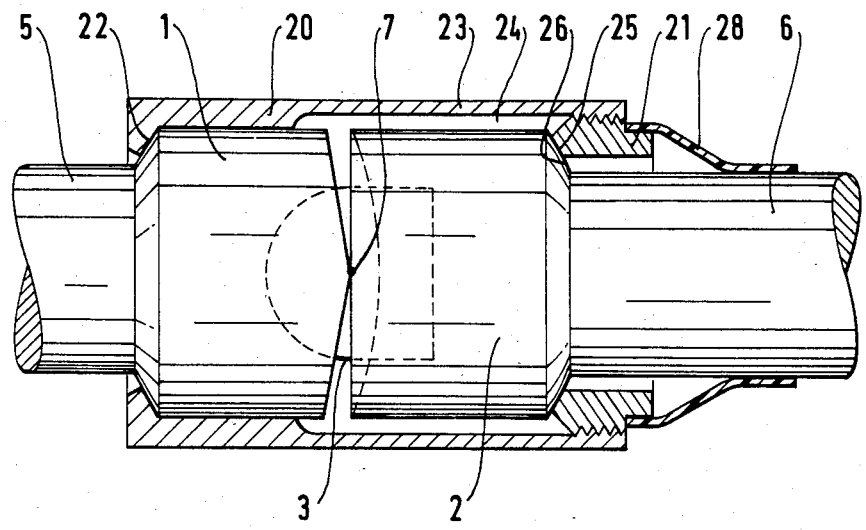
FIG. 4 is a side view of the FIG. 1 coupling shown with the retaining member in axial section.

The retaining members are a sheath 20 and a ring 21 (see FIG. 4).

The sheath 20 is slidably mounted on the end piece 1 and it bears against it via a shoulder 22 at the rear of the end piece. It is thus linked to any movement of the first end piece 1. The front portion 23 of the sheath is hollow and constitutes a chamber 24 within which the second end piece 2 is free to move.

The ring 21 is screwed into the sheath 20 and is provided with a concave spherical bearing surface 25 that co-operates with a convex spherical bearing surface 26 at the rear of the second end piece 2, and centered on the point 7.

Relative sliding between the spherical bearing surfaces 25 and 26 thus enables the shaft 6 to oscillate and prevents untimely separation of the end pieces 1 and 2.

A rubber sleeve 28 keeps dust etc. away from the working surfaces of the spherical bearing.

Figure 6:
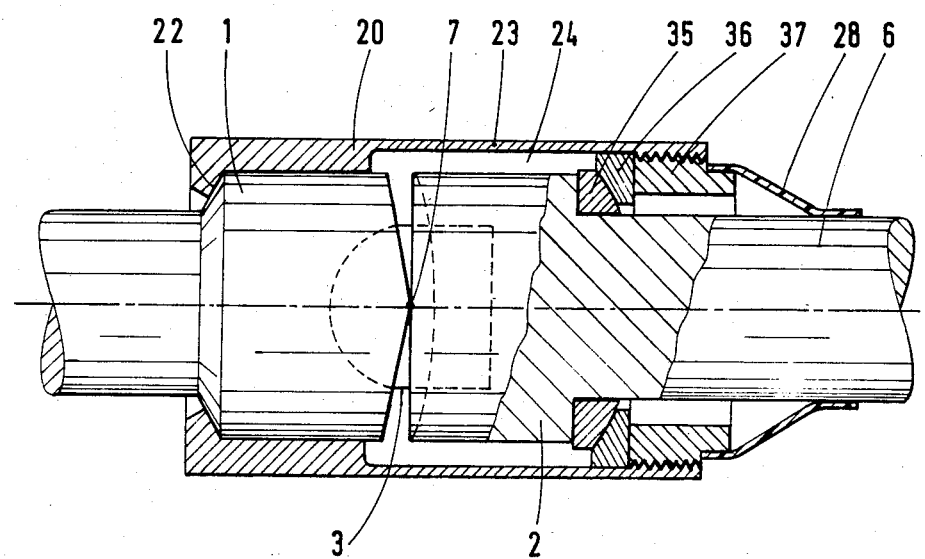
FIG. 6 is a side view in partial axial section of a variant of the coupling shown in FIG. 1.

FIG. 6 shows a variant, in which the spherical bearing surfaces are not made directly on the end piece 2 and on the screw ring 21, but are made instead on separate rings 35 and 36 with the ring 35 having a convex bearing surface and the ring 36 having a concave bearing surface. A screw ring 37 provides axial thrust to hold the spherical bearing surface together.

A coupling having the features shown in FIGS. 5 and 6 constitutes a preferred embodiment of the present invention and has the following advantages over the prior art coupling described in British patent specification No. 2 110 792 A.

Firstly all the parts are of very simple shapes that can easily be machined using conventional techniques.

The core 3 is capable of transmitting higher torque in a given volume, and each of its working surfaces is contiguous with another working surface. Further, torque transmission is shared between the plane semicircular surfaces and the semi-cylindrical surfaces, and there is no change in the core cross section in the middle of its axial length, since the length of the semi-cylindrical portions is chosen to be equal to their diameter.

The concave bearing surfaces which receive the core are in the form of two half shells 31 and 32 having outside surfaces which are very simple in shape, thereby enabling them to be rapidly and easily inserted in the end pieces in recesses which are equally simple in shape, and which can thus be machined with simple equipment.

Further, this arrangement also provides the advantage of being able to replace the parts subject to wear (the core and the half shells) whenever required, and facilitates adapting them to various operating requirements by a suitable choice of materials and surface finishes.

In particular, this arrangement means that pairs of standard (and thus relatively cheap) end pieces can be offered in conjunction with specialized working surfaces adapted to meet specific user requirements.

Finally, providing an external sheath 20 having a common axis with one of the end pieces (1) has two advantages: firstly it guides and maintains the spherical working surfaces 35 and 36 (and here again, the parts subject to wear can be tailored to specific conditions); and secondly it enables axial play to be closely adjusted and taken up by suitable positioning of the screw ring or nut 37.

Another advantage of this solution lies in its smooth cylindrical shape which makes it simple to keep mechanism sealed off in a manner which is simple, and above all effective (sleeve 28).

In contrast to the present invention, the above-mentioned British patent specification describes parts which are awkward in shape with end pieces 1 and 2 that require high quality spherical machining. The cross 3 is also difficult to machine, and is too fragile to transmit the levels of torque possible with the present invention.

Further, the end pieces 1 and 2 of the prior device are pieces subject to wear (e.g. on their spherical surfaces and on their circular recesses). Thus very expensive and bulky parts (if the present invention's performance is to be provided) need to be surface treated in the first place and need to be replaced when worn out. That arrangement does not lend itself to being matched to various operational requirements.

In addition to the above-mentioned drawbacks, the prior spherical bearings 4 and tubular casings 5 are free in spherical rotation (three degrees of freedom) which can be prejudicial to the lifetime of the coupling if subjected to shock and vibration.

To sum up, the present invention provides a coupling which is well adapted to transmitting high torque and high thrust for small deflections, and it is thus well adapted to drilling systems.

I claim:

1. A small deflection coupling for oscillating shafts, said coupling comprising:

first and second end pieces suitable for fixing to the facing ends of first and second shafts, said end pieces having respective longitudinal axes which substantially intersect at a coupling center, and having respective first and second concave cylindrical bearing surfaces which are of circular symmetry about respective first and second oscillation axes which also substantially intersect at the coupling center and which are perpendicular to respective ones of said longitudinal axes of the first and second end pieces, said cylindrical bearing surfaces being of the same diameter;

an intermediate piece having first and second convex cylindrical bearing surfaces which are of circular symmetry about two substantially intersecting perpendicular oscillation axes, said intermediate part being disposed between said end pieces which are oriented relative to one another in such a manner that the first and second convex bearing surfaces of the intermediate piece engage the first and second concave bearing surfaces of the first and second end pieces repsectively, thereby simultaneously enabling driving torque to be transmitted between said shafts when rotating about their axes, enabling axial thrust to be transmitted between said shafts, and, by rocking about said first and second oscillation axes, enabling said shafts to oscillate relatived to each other;

each of said end pieces being in the form of a solid having a front face facing the other end piece, which front face is in the form of a convex dihedral with the line of intersection of the dihedral half-planes constituting the oscaillation axis of the end piece, the dihedral angle being equal to 180° less twice the maximum angle of deflection between the axes of the two end pieces, said concave cylindrical bearing surface being hollowed out in the front face of the end piece such that the cross section of the bearing surface is an arc of a circle extending over said dihedral angle, such that, when said intermediate piece is received in said hollow and any force is applied thereto in a direction which is perpendicular both to the longitudinal axis of the end piece and to the oscillation axis of the end piece, and in particular when any torque is transmitted thereby, a longitudinal reaction is created tending to urge the end piece away form the intermediate piece, the length of the cylindrical concave bearing surface parallel to the generator lines of the cylinder being equal to the length of the convex bearing surface of the intermediate piece so as to prevent the intermediate piece from moving in the hollow of the concave bearing surface in a direction parallel to the oscillation axis of the end piece; and a retaining member for holding said end pieces together agianst said longitudinal reaction;

the improvement wherein:

the intermediate piece is constituted by a solid core having a surface consisting solely of two portions which are semi-cylindrical having a right cross section to the form of a semicircle and which have an axial length equal to the diameter of the semicircle, the center of the semicircle being substantially at the mid point of said axial length whereby the surface of the core is constituted by said semi-cylindrical bearing surfaces, each of which is terminated by two plane semi-circular bearing surfaces extending from the ends of the semicircles of the cylinder, and said plane semicircular bearing surfaces consituting end faces of a semi-cylindrical volume whose side surface is constituted by the other semi-cylindrical bearing surface, whereby said core is capable of transmitting high driving torque and high axial thrust simultaneously, while being easy to machine.

2. A coupling according to claim 1, wherein an add-on shell forms each concave cylindrical bearing surface having a semi-cylindrical inside surface which is machined for surface engagement with a semi-cylindrical bearing surface of the solid core and having plane second and third inside surfaces which are semicircular for surface engagement with the plane bearing surfaces of the core, the outside surfaces of the shell bearing against the walls of a recess hollowed out of the end piece to prevent the shell from moving or from distorting, thereby enabling worn parts to be readily replaced.

3. A coupling according to claim 2, wherein each of said shells is constituted by two half-shells which are placed side-by-side in a prismatic recess of square section hollowed out of the end piece, each half-shell having a semi-cylindrical bearing surface and one semi-circular bearing surface.

4. A coupling according to claim 1, wherein the retaining member is constituted by a rigid sheath which is fixed to the first end piece and which extends beyond the first end piece to encompass the second end piece, said sheath being provided with a spherical concave bearing surface which co-operates with a spherical convex bearing surface on the second end piece, both of said spherical bearing surfaces being centered on the coupling center and each being limited to an annular region surrounding the second shaft.

5. A coupling according to claim 4, wherein the concave spherical bearing surface is formed on a ring which is screwed into the end of the sheath and which projects radially inwardly therefrom so as to enable the second end piece to be inserted in the sheath before the ring is screwed into place, and also enabling axial play due to wear to be taken up.

6. A coupling according to claim 4, wherein two independent rings have formed thereon said spherical bearing surfaces, one for the convex surface, the other for the concave surface, and a third ring screwed into the sheath holds both said first and said second rings in surface abutment.

7. A coupling according to claim 1, wherein the maximum angle of deflection between the logitudinal axes of the first and second end pieces does not exceed 10°.

* * * * *